United States Patent Office 2,862,737
Patented Dec. 2, 1958

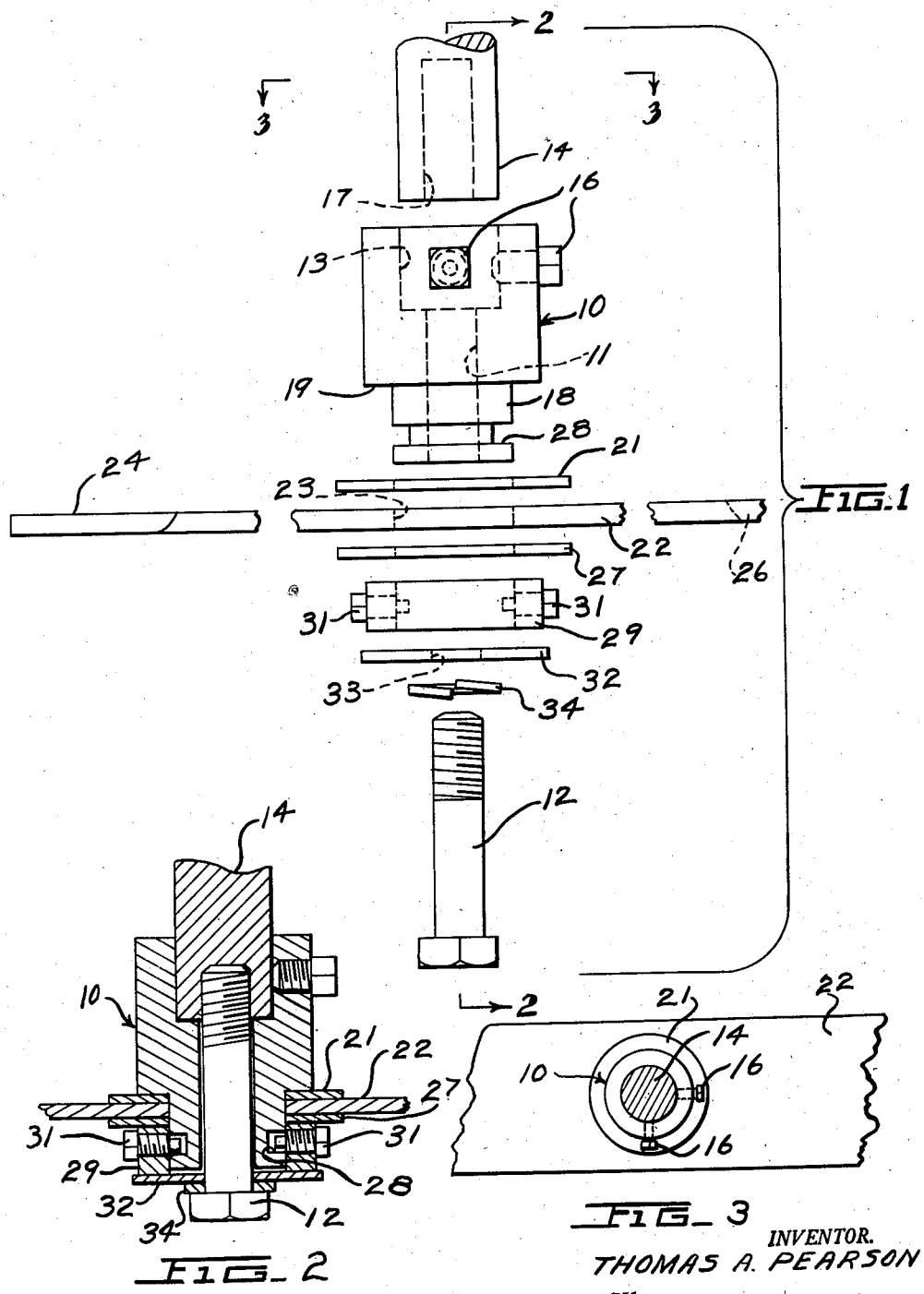

2,862,737

SAFETY ADAPTER FOR ATTACHING A MOWER BLADE TO A SHAFT

Thomas A. Pearson, Selma, Ala., assignor to Southland Mower Company, Inc., a corporation of Alabama Application October 14, 1954, Serial No. 462,142

6 Claims. (Cl. 287—53)

This invention relates to a safety adapter for attaching a mower blade to its drive shaft and has for a prime object the provision of such an adapter which prevents the blade from flying off when its securing means becomes loose, such as when the mower blade strikes an object which causes movement of the shaft relative to the blade.

Another object of my invention is to provide a safety adapter for connecting a mower blade to a drive shaft which disengages the blade from the shaft when its securing means becomes loose whereby the shaft rotates relative to the blade and the blade is held suspended adjacent the lower end of the drive shaft.

A further object of my invention is to provide a safety adapter of the character designated which shall be simple of construction, economical of manufacture and one which shall be readily installed on conventional types of lawn mowers.

Heretofore in the art to which my invention relates, various difficulties have been encountered in retaining mower blades on their drive shafts due to the fact that the mower blade flies off when its securing means becomes loose. That is to say, the mower blade has been secured to its drive shaft by means of cap screws, setscrews and the like without the provision of means to retain the blade on the shaft in the event the cap screw or set screw becomes loose.

To overcome the above difficulties, I provide a cylindrical member adjacent the end of the drive shaft which is of a size to receive the mower blade with a sliding fit. An abutment is provided on the cylindrical member at one side of the mower blade and a safety retainer member is mounted for rotation on the cylindrical member at the opposite side of the blade from the abutment. Axial movement of the retainer member relative to the cylindrical member is limited whereby the shaft supports the blade and is free to rotate relative to the blade. To lock the blade to the drive shaft, means is provided for urging the retainer member toward the mower blade whereby the blade is secured nonrotatably between the abutment and the retainer member.

Apparatus embodying features of my invention is shown on the accompanying drawing forming a part of this application, in which:

Fig. 1 is an exploded view;

Fig. 2 is an assembled sectional view taken generally along the line 2—2 of Fig. 1; and, Fig. 3 is an assembled plan view taken generally along the line 3—3 of Fig. 1.

Referring now to the drawing for a better understanding of my invention I show a cylindrical adapter body 10 having an axially extending opening 11 therethrough for slidably receiving a cap screw 12. The upper portion of the opening 11 is counterbored to provide an enlarged-diameter portion 13. The lower end of the drive shaft for the lawn mower, indicated at 14, fits in the enlarged-diameter portion 13 and is secured to the adapter body 10 by means of setscrews 16. The shaft 14 is provided with an axially extending threaded opening 17 at the lower end thereof for receiving the cap screw 12.

The lower portion of the adapter body 10 is reduced in diameter as at 18 and is joined to the upper portion thereof by an annular shoulder 19. Fitting over the reduced-diameter portion 18 is a washer 21 which is preferably formed of a soft material, such as aluminum or the like. Fitting over the reduced-diameter portion 18 beneath the washer 21 is a mower blade 22 having a centrally disposed opening 23 therethrough. Suitable cutting elements 24 and 26 are provided at opposite ends of the mower blade. Fitting over the reduced-diameter portion 18 beneath the mower blade 22 is a second washer 27, which is also preferably formed of a soft material such as aluminum.

An annular recess 28 is provided in the reduced-diameter portion 18 in position to lie below the washer 27 when it is assembled on the adapter body. Surrounding the reduced-diameter portion 18 and overlying the annular recess 28 is a retaining collar 29. The retaining collar 29 is provided with threaded openings therethrough for receiving dog-point screws 31, the inner ends of which extend loosely into the annular recess 28 to retain the collar on the adapter body 10. Preferably the dog-point screws are positioned diametrically opposite each other, as shown in Figs. 1 and 2.

Bearing against the undersurface of the retaining collar 29 is a washer 32 having an opening 33 therethrough for receiving the cap screw 12. A suitable lock washer 34 is placed on the cap screw 12 in position to engage the undersurface of the washer 32 and lock the same against rotation.

From the foregoing description, the operation and installation of my improved safety adapter will be readily understood. To assemble the unit, the washer 21, the blade 22 and the washer 27 are positioned on the reduced-diameter portion 18, as shown in Fig. 2. The dog-point screws 31 are backed out of their threaded openings whereby the retaining collar 29 will pass over the reduced-diameter portion 18. After the retaining collar 29 is in place against the washer 27, the dog-point screws 31 are tightened whereby the points on the screws enter the annular recess 28 on the adapter body. When the retaining collar 29 is thus assembled, the blade 22 is free to rotate relative to the adapter body 10 which is now ready for installation on the mower drive shaft 14. This is accomplished by placing the lock washer 34 and the washer 32 over the cap screw 12 and inserting the cap screw in the opening 11. The adapter body is moved over the drive shaft 14 whereby the drive shaft fits in the enlarged-diameter portion 13. The cap screw 12 is then screwed into the threaded opening 17 in the drive shaft, thus forcing the collar 29 upwardly toward the blade 22 whereby the blade together with the washers 21 and 27 are clamped firmly between the shoulder 19 and the retaining collar 29. The setscrews 16 are then tightened thereby securing the adapter body 10 to the drive shaft 14.

With the apparatus assembled as described above, mower blade 22 rotates with the shaft 14. However, should the cap screw 12 become loose as when the blade 22 strikes an object which causes the shaft 14 to move relative to the blade the collar 29 moves downwardly away from the blade thus permitting free rotation of the blade relative to the adapter body. The inner ends of the dog-point screws 31 project within the annular recess 28 thereby limiting axial movement of the retaining collar 29 on the adapter body. With the cap screw 12 or locking means disengaged from the drive shaft 14, the blade 22 remains stationary and suspended from the shaft while the shaft rotates relative thereto.

To place the mower blade back in operation, the cap screw 12 is threaded into the opening 17 of the drive shaft. As the cap screw moves upwardly it lifts the retaining collar 29 whereby the blade 22 and its washers 21 and 27 are clamped between the shoulder 19 and the retaining collar 29.

From the foregoing it will be seen that I have devised an improved safety adapter for attaching a mower blade to a vertical drive shaft of a lawn mower. By providing a retaining collar which limits axial movement of the blade relative to the adapter body and drive shaft, in the event the securing means becomes loose, I have greatly reduced the hazards encountered in the mowing operation. I have found in actual practice that my safety adapter for connecting mower blades to a drive shaft is satisfactory in every respect and may be readily installed on conventional type lawn mowers having vertical drive shafts without interfering with the cutting efficiency thereof.

While I have shown my invention in but one form, it will be obvious to those skilled in the art that it is not so limited but is susceptible of various changes and modifications without departing from the function thereof, and I desire, therefore, that only such limitations shall be placed thereupon as are specifically set forth in the appended claims.

What I claim is:

1. A safety adapter for attaching a rotary element to a drive shaft, said rotary element having a centrally disposed opening therethrough, said adapter comprising a cylindrical member to be mounted on one end of the drive shaft, said cylindrical member being constructed and arranged to extend through said opening and receive said rotary element with a rotary and sliding fit, said cylindrical member having an abutment disposed at one side of said rotary element, a retainer member having at least one inwardly extending projection thereon, said projection being mounted loosely on said cylindrical member for rotatable and limited axial movement with respect thereto, said retainer member rotatably and axially slidably fitting said cylindrical member at that side of said rotary element opposite said abutment, means limiting axial movement of said retainer member and its projection relative to said cylindrical member, and locking means to be connected to said shaft for urging said retainer member toward said abutment whereby said rotary element will be secured between said abutment and said retainer member for rotation as a unit with said cylindrical member, retainer member and locking means.

2. A safety adapter for attaching a rotary element to a drive shaft, said rotary element having a centrally disposed opening therethrough, said adapter comprising a rotary member rigidly connected to said drive shaft for rotation therewith, said rotary member having a cylindrical portion extending through said opening and receiving said rotary element with a sliding fit, said rotary member having an abutment disposed at one side of said rotary element and an annular recess at that side of said rotary element opposite said abutment, a collar surrounding said rotary member and overlying said recess, at least one inwardly extending projection on said collar, the inner end of said projection fitting slidably in said recess, and locking means urging said collar toward said abutment whereby said rotary element is secured between said abutment and said collar for rotation therewith.

3. A safety adapter for attaching a mower blade to a vertical drive shaft, said mower blade having a centrally disposed opening therethrough, said adapter comprising a cylindrical member having a lower end of a reduced diameter extending through said opening and receiving said blade with a sliding fit and defining a radially extending annular shoulder above said blade, means connecting the upper end of said cylindrical member to the lower end of said shaft, the lower end of said cylindrical member having an annular recess located below said blade, a collar surrounding said lower end and overlying said recess, inwardly extending projections carried by said collar, the inner ends of said projections fitting slidably in said recess, said cylindrical member having an axially extending opening therethrough and the lower end of said shaft having a threaded opening therein, and a locking member extending through said axially extending opening and into threaded engagement with said threaded opening and disposed to urge said collar upwardly whereby said blade is held between said collar and said shoulder and against rotation relative to said cylindrical member.

4. An adapter as defined in claim 3 in which the cylindrical member is counterbored adjacent the upper end of the axially extending opening to receive the lower end of the drive shaft and in which said means connecting the upper end of said cylindrical member to the drive shaft includes setscrews.

5. An adapter as defined in claim 3 in which the inwardly extending projections are dog-point screws which are in threaded engagement with radially extending openings in the collar.

6. A safety adapter for attaching a mower blade to a vertical drive shaft, said mower blade having a centrally disposed opening therethrough, said adapter comprising a cylindrical member having a lower end of a reduced diameter extending through said opening and receiving said blade with a sliding fit and defining a radially extending annular shoulder above said blade, means securing the upper end of said cylindrical member to the lower end of said shaft, the lower end of said cylindrical member having an annular recess below said blade, a collar surrounding said lower end and overlying said recess, diametrically opposed, inwardly extending dog-point screws carried by said collar, the inner ends of said dog-point screws fitting slidably in said recess, said cylindrical member having an axially extending opening therethrough and the lower end of said shaft having a threaded opening therein, a cap screw extending through said axially extending opening and into threaded engagement with said threaded opening, and a washer surrounding the cap screw below the collar, said washer being of a size to engage the collar and force the same upward as the cap screw moves upward whereby said blade is held between said collar and said shoulder and against rotation relative to said cylindrical member.

References Cited in the file of this patent

UNITED STATES PATENTS

| | | |
|---|---|---|
| 261,887 | Whitney | Aug. 1, 1882 |
| 751,635 | Gustafson | Feb. 9, 1904 |
| 2,345,910 | Fawcett | Apr. 4, 1944 |
| 2,651,530 | Blydenburgh | Sept. 8, 1953 |
| 2,660,847 | Britten | Dec. 1, 1953 |